(12) United States Patent
Hayakawa

(10) Patent No.: US 6,618,197 B1
(45) Date of Patent: Sep. 9, 2003

(54) IMAGE STABILIZING SYSTEM

(75) Inventor: Shingo Hayakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/995,896

(22) Filed: Dec. 22, 1997

(30) Foreign Application Priority Data

Dec. 27, 1996 (JP) .............................................. 8-358437

(51) Int. Cl.⁷ ............................................... G02B 27/64
(52) U.S. Cl. ........................... 359/557; 359/766; 396/55
(58) Field of Search ................................ 359/554, 557, 359/746, 753, 766; 396/52, 55

(56) References Cited

U.S. PATENT DOCUMENTS

| | | | |
|---|---|---|---|
| 4,774,401 A | 9/1988 | Yamada et al. ............. | 250/201 |
| 4,855,780 A | 8/1989 | Hayakawa .................. | 354/432 |
| 4,870,443 A | 9/1989 | Hayakawa et al. ......... | 354/432 |
| 4,927,250 A | 5/1990 | Suda | |
| 5,000,549 A | 3/1991 | Yamazaki | |
| 5,119,124 A | 6/1992 | Ito et al. ..................... | 354/409 |
| 5,442,486 A * | 8/1995 | Sato ............................ | 359/690 |
| 5,654,826 A * | 8/1997 | Suzuki ........................ | 359/557 |
| 5,678,071 A * | 10/1997 | Ohtake ........................ | 396/55 |
| 5,774,267 A * | 6/1998 | Kodama et al. ............. | 359/557 |
| 5,828,490 A * | 10/1998 | Sato ............................ | 359/557 |

FOREIGN PATENT DOCUMENTS

| | | |
|---|---|---|
| JP | 50-80147 | 6/1975 |
| JP | 56-21133 | 5/1981 |
| JP | 61-223819 | 10/1986 |
| JP | 7-168135 | 7/1995 |
| JP | 8-304698 | 11/1996 |

* cited by examiner

*Primary Examiner*—Mark A. Robinson
(74) *Attorney, Agent, or Firm*—Fitzpatrick, Cella, Harper & Scinto

(57) ABSTRACT

An image stabilizing optical objective lens system comprising, in the order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power. The objective lens system performs focusing by moving the second lens unit in the direction of the optical axis of the system for focusing and corrects image blur by moving the fourth lens unit in the direction perpendicular to the optical axis.

17 Claims, 12 Drawing Sheets

IMAGE STABILIZING SYSTEM

BACKGROUND OF THE INVENTION

1. Field of the Invention

The present invention relates to an optical system which is provided with an image stabilizing function for correcting image blurring arising from the movement of the optical system. More particularly, the present invention relates to an optical system with an image stabilizing function which employs an inner focus method in which a movable lens unit for image stabilizing is moved in a direction perpendicular to the optical axis of the system to preclude a drop in optical performance.

2. Description of the Related Art

If picture taking is attempted in a moving vehicle such as a car or an airplane in motion, an imaging system (an imaging lens) is subject to shake, thereby blurring images.

When an imaging system having a long focal length is used, the controlling of shake of the imaging system is particularly difficult. If the imaging system is tilted due to shaking, the resulting image is displaced according to the tilt angle and the focal length of the system. For this reason, a sufficiently long photographic operation time is required to prevent image degradation in a still picture taking device, and the maintaining of a photographic composition is difficult in a moving picture taking device. When the imaging system is tilted due to shaking during picture taking, it is necessary to correct image blur.

Image stabilizing optical systems for precluding image blurring are disclosed, for example, in Japanese Patents Laid-Open Nos. 50-80147 and 56-223819 and Japanese Examined Patent Publication 56-21133.

Japanese Patent Laid-Open No. 50-80147 discloses a zoom lens having two a focal variable power systems, namely a first variable power system having an angular magnification of $M_1$ and a second variable power system having an angular magnification of $M_2$. Both variable power systems vary respective magnifications to maintain the relationship of $M_1=1-1/M_2$ while the second variable power system is spatially secured to correct image blurring and thus to stabilize images.

According to Japanese Examined Patent Publication No. 56-21133, part of an optical member in an optical device is moved in the direction of stabilizing an image to cancel out the movement of the optical device in response to an output signal from detector means for detecting the movement of the optical device.

Japanese Patent Laid-Open No. 61-223819 discloses an imaging system having a variable apex angle prism at its side closest to an object. The apex angle of the prism is varied in accordance with the movement of the imaging system to deflect an image for image stabilization.

The inventor of this invention discloses, in Japanese Patent Laid-Open Nos. 7-168135 and 8-304698, an image stabilizing optical system in which a lens unit in an imaging optical system is moved in a direction perpendicular to the optical axis of the system to compensate for image blurring arising from the movement of the entire system.

Still image taking devices, which preclude image blurring by moving part of a lens unit of its imaging system preferably have the following features: a large quantity of correction for image blurring, a small linear or angular travel of the lens unit (movable lens unit) that is moved for correction of image blurring, and a compact overall size.

When a large decentering aberration takes place with the movable lens unit decentered, the decentering aberration causes a resulting image to blur even when image blurring correction is attempted.

In an image stabilizing optical system, decentering aberration must be small when the movable lens unit is moved in the direction perpendicular to the optical axis for decentering. A small travel of the movable lens must compensate for a large quantity of image blurring; more particularly, a decentering sensitivity (a ratio of unit travel $\Delta H$ to an image blurring correction $\Delta x$, $\Delta x/\Delta H$) has to be large.

In the image stabilizing optical system in which an optical member is spatially secured against the movement of the system, the supporting of such an optical member is difficult and further the implementing of compact design in the optical system is also difficult. An optical system having the variable apex angle prism at its side closest to the object has the advantage that practically no aberrations other than decentering color aberration take place. The optical system has disadvantages that a bulky driving member is needed and that decentering color aberration taking place with the prism is not simply corrected. In the image stabilizing optical system in which part of a lens unit in the imaging optical system is decentered, the optical system may be made compact by selecting and arranging the decentered lens unit properly. This system however cannot cover a large correction range with a small decentering driving input while at the same time correcting decentering coma, decentering astigmatism, decentering curvature of field, and the like.

SUMMARY OF THE INVENTION

It is an object of the present invention to provide an optical system with an image stabilizing function that is suitable for use in a telephoto imaging optical system of an inner focus type, wherein when part of a lens unit in the optical system is decentered in a direction perpendicular to the optical axis of the system to correct the displacement (blurring) of an image, each decentering aberration is properly corrected by arranging each lens element and the entire system is made compact by allowing a sufficiently small decentering driving input to cover a large displacement correction (image blur correction) range.

(1-1) The image stabilizing optical objective lens system of the present invention comprises, in the order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power, wherein the second lens unit is moved in the direction of the optical axis of the system for focusing and the fourth lens unit is moved in the direction perpendicular to the optical axis for correcting image blur.

(1-2) The image stabilizing optical objective lens system of the present invention comprises, in the order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power, wherein the second lens unit is moved in the direction of the optical axis of the system for focusing and the fourth lens unit is moved in the direction perpendicular to the optical axis for correcting image blur, and wherein when the focal length of the entire system is normalized to 1, the following relationships hold true:

$$-5.0 < f4 < -0.7 \tag{1a}$$

$$0.7 < f5 < 5.0 \tag{2a}$$

$$0.5 < |f4/f5| < 2.0 \tag{3a}$$

where I4 and I5 represent respectively the spherical aberrations of the fourth and fifth lens units in connection with an object at infinity.

DESCRIPTION OF THE PREFERRED EMBODIMENTS

Figure 1A:
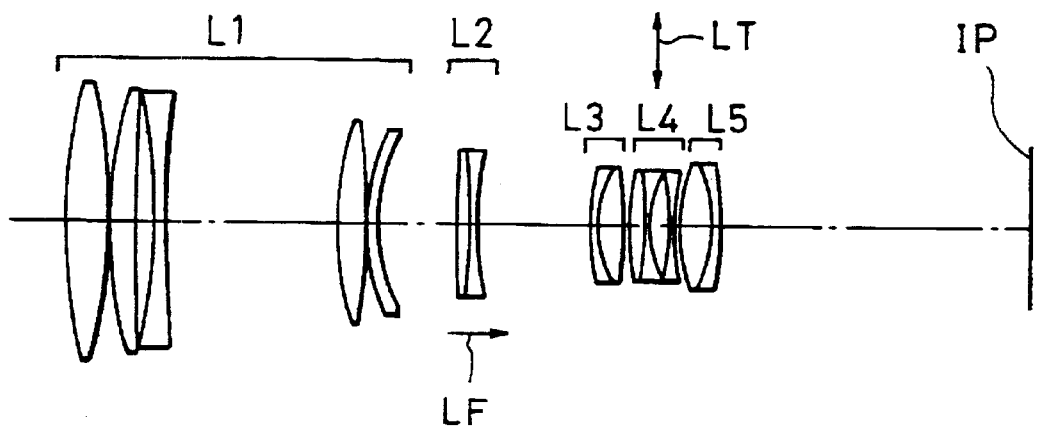
FIGS. 1A and 1B are cross-sectional views of lenses of a first numerical example of the present invention.
Figure 1B:
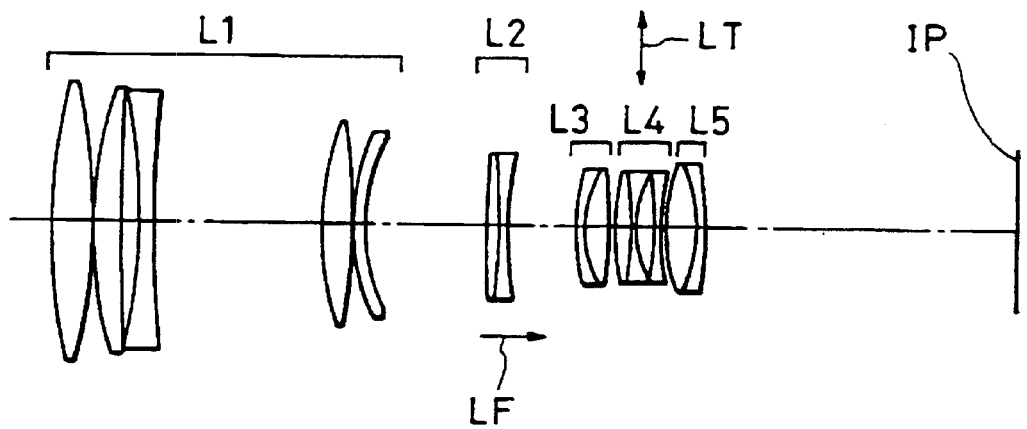

FIGS. 1A and 1B, FIGS. 4A and 4B, FIGS. 7A and 7B, and FIGS. 10A and 10B are cross-sectional views of first through fourth numerical examples of the present invention, respectively. Drawing numbers suffixed by A denote the cross-sectional views of the lenses focused at infinity while drawing numbers suffixed by B denote the cross-sectional views of the lenses focused on an object at a distance 10 times the focal length of an optical system.

Shown in the figures are a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. Focusing on an object at infinity or on an object at near—near distance is performed by moving the second lens unit L2 to the side of an image plane in the direction of the arrow LF, as shown. When the optical system is moved, the correction (stabilization) of (image) blur is performed by moving the movable fourth lens unit L4 in the direction of the arrow LT perpendicular to the optical axis of the system. IP denotes the image plane.

The focal length of the entire system is now normalized to 1, and let I4 and I5 represent the spherical aberrations of the fourth and fifth lens units at an infinity focus position. By maintaining the conditions expressed by equations (1a), (2a) and (3a), decentering aberration and decentering coma taking place in the course of image stabilization are properly corrected.

In this embodiment, the lens units are set as described above and inner focusing and image blur correction are performed. In this way a compact design is implemented for the entire optical system and image blur is properly corrected while the generation of aberrations involved in the movement of the fourth lens unit in the direction perpendicular to the optical axis, namely decentering aberrations including decentering coma, decentering astigmatism, decentering curvature of field, and the like is controlled. An excellent optical performance thus results.

Each of the third lens unit through the fifth lens unit is constructed of a sufficiently small number of lens elements, and the arrangement of refractive powers of the units and the configuration of each lens unit are properly set such that not only the aberrations at a reference state but also decentering aberrations including decentering coma, decentering astigmatism, and decentering curvature of field at an image blurring corrected state are excellently corrected.

The image stabilizing optical system of the present invention is thus provided by meeting the above described conditions. To reduce decentering aberration variation involved in image stabilization and to enhance optical performance, at least one of the following conditions (i) through (vi) is preferably met.

(i) The following condition is satisfied:

$$0.25 < f123/f < 0.75 \tag{1}$$

$$0.07 < |f4/f| < 0.15 \tag{2}$$

$$0.10 < f5/f < 0.30 \tag{3}$$

where f123 represents the total focal length of the first lens unit through the third lens unit, f represents the focal length of the entire system and fi represents a focal length of the second lens unit.

In the range below the lower limit in equation (1), the quantity of aberrations taking place in the front lens units (the first through third lens units) increases to such an extent that aberration correction cannot be made any more with a small number of lens elements. In the range above the upper limit in equation (1), a sufficiently large decentering sensitivity cannot be achieved.

Equations (2) and (3) define refractive powers of the fourth and fifth lens units, respectively. If these equations hold true in the optical system when the fourth lens unit is moved in the direction approximately perpendicular to the optical axis for image blur correction, a small travel of the fourth lens unit of a small number of lens elements covers a large image blur correction range while the decentering aberrations are kept minimized.

(ii) The following condition is satisfied.

$$0.35 < f1/f < 0.60 \tag{4}$$

$$0.30 < |f2/f| < 0.70 \tag{5}$$

$$0.25 < f3/f < 0.60 \tag{6}$$

where fi represents a focal length of an i-th lens unit and f represents the focal length of the entire system.

Equations (4) through (6) define the ratios of the total focal length of the entire optical system to the focal lengths of the first through third lens units constituting the optical system, and thus define the distribution of refractive powers in the design of an inner focus optical system having an image stabilizing function and with a telephoto angle of view.

Equation (4) defines the refractive power of the first lens unit. By maintaining the condition expressed by equation (4), color aberration which is a prime concern in an imaging optical system having a telephoto angle of view is relatively easily corrected.

Equation (5) defines the refractive power of the second lens unit. By maintaining the condition expressed by equation (5), a relatively small travel of the second lens unit covers a wide range of focus in focusing from an object at long distance to an object at a sufficiently near distance while aberrations are maintained at an acceptable level.

Equation (6) defines the refractive power of the third lens unit. If equation (6) holds true in the optical system when the fourth lens unit is moved in the direction approximately perpendicular to the optical axis for image blur correction, a small travel of the fourth lens unit of a small number of lens elements covers a large image blur correction range while decentering aberrations are kept minimized.

(iii) The fifth lens unit includes a positive lens with convex surfaces on both sides and a negative meniscus lens with its convex surface looking toward the image plane, both lenses being attached together or spaced apart. The following condition is satisfied.

$$-0.6 < (R5s+R5e)/(R5s-R5e) < 0.1 \qquad (7)$$

where $R5s$ and $R5e$ represent respectively the radii of curvature of the lens surface of the fifth lens unit closest to the object and the lens surface of the fifth lens unit closest to an image plane.

Equation (7) defines a shape factor of the entire fifth lens unit. When the condition expressed by equation (7) is maintained, the fifth lens unit generates an under-corrected spherical aberration and a predetermined quantity of coma, both of which compensate for decentering coma in particular way during image blur. Correction of decentering aberrations during image blur correction will be briefly discussed later using equations. By leaving the predetermined quantities of aberrations in the lens arrangement in the fifth lens unit, the decentering aberrations that take place when the fourth lens unit is moved in the direction approximately perpendicular to the optical axis are effectively corrected.

The fifth lens unit includes one positive lens and two negative lenses, and residual color aberration in its lens arrangement is set to a predetermined quantity which helps correct a decentering color aberration that takes place when the fourth lens unit is decentered.

(iv) The fourth lens unit comprises, in the order from the side of the system closest to the object, one positive lens having convex surfaces on both lens sides and two negative lenses, each having concave surfaces on both lens sides, wherein the following relationship holds true:

$$-10 < (R4s+R4e)/(R4s-R4e) < -1.5 \qquad (8)$$

where $R4s$ and $R4e$ represent respectively the radii of curvature of the lens surface of the fourth lens unit closest to the object and the lens surface of the fourth lens unit closest to an image plane.

Equation (8) defines a shape factor of the entire fourth lens unit. When the condition expressed by equation (8) is maintained, the fourth lens unit having a negative refractive power generates an under-corrected spherical aberration and a relatively small quantity of coma, both of which cancel out aberrations created by the fifth lens unit. In this way, the decentering aberrations during image blur correction, and decentering coma in particular, are excellently corrected.

The fourth lens unit includes three lenses: one positive lens and two negative lenses. The two negative lenses are employed to achieve a relatively strong negative power. Besides, the single positive lens is employed to adjust color aberration residing in the lens unit to a predetermined quantity, which cancels out color aberration created by the fifth lens unit. In this way, decentering color aberration that takes place when the fourth lens unit is decentered is properly corrected.

(v) The third lens unit comprises, in the order from the side of the system closest to the object, one negative meniscus lens having a convex surface looking toward the object and two positive lenses, each having convex surfaces on both lens sides, wherein the following relationship holds true:

$$-1.5 < (R3s+R3e)/(R3s-R3e) < -0.2 \qquad (9)$$

where $R3s$ and $R3e$ represent respectively the radii of curvature of the lens surface of the third lens unit closest to the object and the lens surface of the third lens unit closest to an image plane.

Equation (9) defines a shape factor of the entire third lens unit. When the condition expressed by equation (9) is maintained, the third lens unit generates predetermined quantities of under-corrected spherical aberration and over-corrected coma. In this way, the aberrations of the entire system are properly corrected.

The third lens unit, including one negative lens and two positive lenses, adjusts the color aberrations created by the fourth and fifth lens units to predetermined quantities which are used to correct a decentering color aberration that takes place when the fourth lens unit is moved in the direction approximately perpendicular to the optical axis. In this way the color aberration of the entire system is properly corrected.

(vi) The first lens unit includes two positive lenses and one negative lens and the second lens unit includes a positive lens and a negative lens.

Aberration variations during focusing are properly corrected and an excellent optical performance results.

As described above, the image stabilizing optical system achieves the above-described object by properly arranging the refractive powers of the lens units. Furthermore, the combining of the shapes of the lens units that are properly set corrects particularly the decentering coma and decentering color aberration, and helps keep the quality of images high during displacement compensation.

The optical features of the image stabilizing optical system are now discussed. Generally speaking, when part of a lens unit in an optical system is decentered in parallel displacement to correct image blur, image quality drops due to the generation of decentering aberration. In any particular refractive power arrangement, decentering aberration is generated when the movable lens unit is moved in the direction perpendicular to the optical axis to correct image blur. The generation of decentering aberration is now discussed based on aberration theory that was presented by Matsui in the 23rd lecture meeting conducted by The Japan Society of Applied Physics in 1962.

When a lens unit P that is part of an optical system is decentered in parallel displacement, a resulting aberration ΔY1 of the entire optical system is the sum of aberration ΔY prior to the decentering and a decentering aberration ΔY(E) resulting from the decentering as expressed by equation (a). Aberration ΔY is expressed using spherical aberration (I), coma (II), astigmatism (III), Petzval sum (P), and distortion (V). Decentering aberration ΔY(E) is expressed by equation (c) using a first-order decentering coma (IIE), a first-order decentering astigmatism (IIIE), a first-order decentering curvature of field (PE), a first-order decentering distortion (VE1), a first-order additional distortion (VE2), and a first-order origin displacement (ΔE).

Let $\alpha_P$, $\alpha a_P$ represent incident angles of light rays to the lens unit P in the optical system when the lens unit P is decentered in parallel displacement and let a q-th lens unit collectively represents units arranged between the lens unit P and the image plane. Aberration coefficients (ΔE)–(VE2) are expressed by equations (d)–(i) using aberration coefficients $I_P$, $II_P$, $III_P$, $P_P$, and $V_P$ of the lens unit P and aberration coefficients $I_q$, $II_q$, $III_q$, $P_q$, and $V_q$ of the q-th lens unit.

[Equation 1]

$$\Delta Y1 = \Delta Y + \Delta Y(E) \ldots \quad (a)$$

$$\Delta Y = \frac{1}{2\alpha'_K}[(N_1\tan\omega)^3\cos\phi\omega \cdot V +$$

$$(N_1\tan\omega)^2 R\{2\cos\phi\omega\cos(\phi_R - \phi\omega)\cdot III +$$

$$\cos\phi_R(III + P)\} + (N_1\tan\omega)R^2\{2\cos\phi_R\cos(\phi_R - \phi\omega) +$$

$$\cos\phi\omega\}\cdot II + R^3\cos\phi\cdot I] \quad (b)$$

$$\Delta Y(E) = -\frac{E}{2\alpha'_K}\Big[(N_1\tan\omega)^2\{(2 + \cos2\phi\omega)(VE1) - (VE2)\} +$$

$$2(N_1\tan\omega)R[\{2\cos(\phi_R - \phi\omega) + \cos(\phi_R + \phi\omega)\}(IIIE) +$$

$$\cos\phi_R\cos\phi\omega\cdot(PE)] +$$

$$R^2(2 + \cos2\phi_R)(IIE)\Big] - \frac{E}{2\alpha'_K}(\Delta E) \quad (c)$$

$$(\Delta E) = -2(\alpha_P' - \alpha_P) = -2h_P\phi_P \quad (d)$$

$$(IIE) = \alpha a_P II_q - \alpha_P(II_P + II_q) - \alpha a_P' I_q + \alpha a_P(I_P + I_q) = h_P\phi_P II_q - \alpha_P II_P - (h a_P\phi_P I_q - \alpha a_P I_P) \quad (e)$$

$$(IIIE) = \alpha_P' III_q - \alpha_P(III_P + III_q) - \alpha a_P' II_q + \alpha a_P(II_P + II_q) = h_P\phi_P III_q - \alpha_P III_P - (h a_P\phi_P II_q - \alpha a_P II_P) \quad (f)$$

$$(PE) = \alpha_P' P_q - \alpha_P(P_P + P_q) = h_P\phi_P P_q - \alpha_P P_P \quad (g)$$

$$(VE1) = \alpha_P' V_q - \alpha_P(V_P + V_q) - \alpha a_P' III_q + \alpha a_P(III_P + III_q) = h_P\phi_P V_q - \alpha_P V_P - (h a_P\phi_P III_q - \alpha a_P III_P) \quad (h)$$

$$(VE2) = \alpha a_P' P_q - \alpha a_P(P_P + P_q) = h a_P\phi_P P_q - \alpha a_P P_P \quad (i)$$

From the above equations, it can be seen that the aberration coefficients $I_P$, $II_P$, $III_P$, $P_P$, and $V_P$ of the lens unit P have to be minimized to control generation of aberration coefficients or that the aberration coefficients have to be well-balanced such that they cancel out each other as shown in equations (a)–(i).

The decentering aberration coefficients expressed by equations (d)–(i) have to be minimized. To this end, proper values are set for the converted inclination angles $\alpha_P$, $\alpha'_P$, $\alpha a_P$, and $\alpha a_P'$ of the paraxial rays that enter and then exit from the lens unit P that is decentered in parallel displacement, third-order aberration coefficients $I_P$, $II_P$, $III_P$, $P_P$, and $V_P$ of the lens unit P that is decentered in parallel displacement, and third-order aberration coefficients $I_q$, $II_q$, $III_q$, $P_q$, and $V_q$ of all lens units that are arranged between the lens unit P that is decentered in parallel displacement and the image plane.

To achieve the above purpose, firstly a small travel of the lens unit has to cover a large blur correction angle. To this end, the absolute value of the first-order origin displacement expressed by equation (d) must be large; more particularly, variations in the converted inclination angles of the paraxial rays at the blur correction lens unit must be large.

Secondly, it is necessary to correct the degradation that takes place in the center of an image when the lens unit is vertically decentered in parallel displacement, namely in the direction perpendicular to the optical axis. To this end, chiefly the first-order decentering coma expressed by equation (e) needs correction. Furthermore, it is necessary to correct a one-sided blur that takes place when the lens unit is decentered in parallel displacement. To this end, chiefly the first-order decentering curvature of field expressed by equation (g) needs correction. Besides, other aberrations have to be suitably corrected.

According to the present invention, the entire lens system is made compact by constructing each lens unit of a minimum number of lenses, while the aberrations of the entire system are properly corrected. The decentering aberrations that take place when the predetermined lens unit is vertically decentered in the direction perpendicular to the optical axis are also properly corrected. An excellent image thus results.

Equations (1) through (5) described above serve to set converted inclination angles $\alpha_P$ and $\alpha'_P$ of the paraxial ray that enters and exits from the lens unit that is vertically moved in the direction perpendicular to the optical axis for image blur correction. When refractive powers of the lens units are arranged to meet the conditions provided by these equations, the aberrations including the above decentering aberrations are properly corrected as long as the lens count of each lens unit is kept small and the approximate lens configurations of the lens units are proper.

According to the present invention, equations (6) and (7) define the general configurations of the fifth lens unit and the fourth lens unit to properly correct decentering aberrations taking place when the fourth lens unit is vertically moved in a direction perpendicular to the optical axis, particularly the first-order decentering coma expressed by equation (e). When the lens configurations are set up as defined by equations (6) and (7), the third-order aberrations I and II in the fifth lens unit and the fourth lens unit reach approximately their desired values, causing the value of equation (e) to be nearly zero. The first-order decentering coma is thus properly corrected.

The numerical examples of the present invention are now listed. In the listings, Ri represents a radius of curvature of the lens surface of an i-th lens from the side closest to an object, Di represents the lens thickness of the i-th lens from the side closest to the object and its air gap, and Ni and vi represent the refractive index and Abbe number of glass of the i-th lens from the side closest to the object. Table 1 shows the equations (1a) through (9) and their resulting values computed for each of the following numerical examples.

First Numerical Example

| F = 295.67490 | FNO = 1:4.1 | 2ω = 8.4° | |
|---|---|---|---|
| R1 = 194.045 | D1 = 9.40 | N1 = 1.48749 | ν1 = 70.2 |
| R2 = −176.294 | D2 = 1.00 | | |
| R3 = 114.139 | D3 = 7.00 | N2 = 1.49700 | ν2 = 81.6 |
| R4 = 1268.615 | D4 = 4.00 | | |
| R5 = −211.271 | D5 = 3.50 | N3 = 1.80610 | ν3 = 41.0 |
| R6 = 355.266 | D6 = 45.00 | | |
| R7 = 91.406 | D7 = 6.70 | N4 = 1.49700 | ν4 = 81.6 |
| R8 = −407.543 | D8 = 0.30 | | |
| R9 = 56.692 | D9 = 3.00 | N5 = 1.63980 | ν5 = 34.5 |
| R10 = 44.685 | D10 = 22.00 | | |
| R11 = 434.773 | D11 = 2.70 | N6 = 1.80518 | ν6 = 25.4 |
| R12 = −319.992 | D12 = 2.00 | N7 = 1.69680 | ν7 = 55.5 |
| R13 = 76.330 | D13 = 30.00 | | |
| R14 = 59.007 | D14 = 1.60 | N8 = 1.84666 | ν8 = 23.9 |
| R15 = 28.192 | D15 = 6.20 | N9 = 1.63930 | ν9 = 44.9 |
| R16 = −384.756 | D16 = 2.00 | | |
| R17 = 59.836 | D17 = 4.00 | N10 = 1.80518 | ν10 = 25.4 |
| R18 = −107.963 | D18 = 1.50 | N11 = 1.69680 | ν11 = 55.5 |
| R19 = 27.733 | D19 = 5.30 | | |
| R20 = −60.208 | D20 = 1.50 | N12 = 1.77250 | ν12 = 49.6 |
| R21 = 98.283 | D21 = 1.50 | | |
| R22 = 54.090 | D22 = 8.00 | N13 = 1.69680 | ν13 = 55.5 |
| R23 = −38.970 | D23 = 1.80 | N14 = 1.83400 | ν14 = 37.2 |
| R24 = −93.113 | | | |

Second Numerical Example

| F = 300.02301 | FNO = 1:4.1 | 2ω = 8.4° | |
|---|---|---|---|
| R1 = 190.726 | D1 = 9.50 | N1 = 1.43875 | ν1 = 95.0 |
| R2 = −169.510 | D2 = 1.00 | | |
| R3 = 125.758 | D3 = 6.70 | N2 = 1.48749 | ν2 = 70.2 |
| R4 = 2432.674 | D4 = 4.00 | | |
| R5 = −211.341 | D5 = 3.50 | N3 = 1.80610 | ν3 = 41.0 |
| R6 = 485.633 | D6 = 45.00 | | |
| R7 = 81.384 | D7 = 6.80 | N4 = 1.48749 | ν4 = 70.2 |
| R8 = −1094.089 | D8 = 0.30 | | |
| R9 = 54.434 | D9 = 3.00 | N5 = 1.67270 | ν5 = 32.1 |
| R10 = 44.828 | D10 = 22.00 | | |
| R11 = 477.097 | D11 = 3.00 | N6 = 1.80518 | ν6 = 25.4 |
| R12 = −263.332 | D12 = 2.00 | N7 = 1.69680 | ν7 = 55.5 |
| R13 = 81.665 | D13 = 25.50 | | |
| R14 = 69.592 | D14 = 1.60 | N8 = 1.84666 | ν8 = 23.9 |
| R15 = 31.391 | D15 = 5.80 | N9 = 1.60323 | ν9 = 42.3 |
| R16 = −197.241 | D16 = 7.00 | | |
| R17 = 58.469 | D17 = 4.00 | N10 = 1.80518 | ν10 = 25.4 |
| R18 = −109.373 | D18 = 1.50 | N11 = 1.69680 | ν11 = 55.5 |
| R19 = 26.918 | D19 = 5.20 | | |
| R20 = −57.599 | D20 = 1.50 | N12 = 1.77250 | ν12 = 49.6 |
| R21 = 111.442 | D21 = 1.50 | | |
| R22 = 54.121 | D22 = 7.80 | N13 = 1.69680 | ν13 = 55.5 |
| R23 = −36.944 | D23 = 1.80 | N14 = 1.85026 | ν14 = 32.3 |
| R24 = −88.676 | | | |

Third Numerical Example

| F = 392.88007 | FNO = 1:5.7 | 2ω = 6.3° | |
|---|---|---|---|
| R1 = 131.613 | D1 = 9.20 | N1 = 1.48749 | ν1 = 70.2 |
| R2 = −219.056 | D2 = 1.00 | | |
| R3 = 108.295 | D3 = 6.50 | N2 = 1.43875 | ν2 = 95.0 |
| R4 = 970.501 | D4 = 2.50 | | |
| R5 = −297.101 | D5 = 3.70 | N3 = 1.78590 | ν3 = 44.2 |
| R6 = 192.710 | D6 = 52.50 | | |
| R7 = 73.951 | D7 = 6.00 | N4 = 1.49700 | ν4 = 81.6 |
| R8 = 1533.077 | D8 = 0.30 | | |
| R9 = 68.549 | D9 = 3.50 | N5 = 1.60311 | ν5 = 60.7 |
| R10 = 46.086 | D10 = 27.50 | | |
| R11 = 232.876 | D11 = 2.60 | N6 = 1.80518 | ν6 = 25.4 |
| R12 = −1202.204 | D12 = 2.00 | N7 = 1.69680 | ν7 = 55.5 |
| R13 = 72.946 | D13 = 35.00 | | |
| R14 = 47.733 | D14 = 1.70 | N8 = 1.84666 | ν8 = 23.9 |
| R15 = 31.099 | D15 = 6.00 | N9 = 1.51823 | ν9 = 59.0 |
| R16 = 6263.704 | D16 = 7.00 | | |
| R17 = 83.176 | D17 = 3.50 | N10 = 1.84666 | ν10 = 23.8 |
| R18 = −116.282 | D18 = 1.50 | N11 = 1.69680 | ν11 = 55.5 |
| R19 = 32.865 | D19 = 4.70 | | |
| R20 = −63.126 | D20 = 1.50 | N12 = 1.77250 | ν12 = 49.6 |
| R21 = 130.872 | D21 = 2.0 | | |
| R22 = 65.786 | D22 = 8.00 | N13 = 1.69680 | ν13 = 55.5 |
| R23 = −35.032 | D23 = 1.80 | N14 = 1.83400 | ν14 = 37.2 |
| R24 = −82.833 | | | |

Fourth Numerical Example

| F = 392.82657 | FNO = 1:5.7 | 2ω = 6.3° | |
|---|---|---|---|
| R1 = 147.271 | D1 = 9.00 | N1 = 1.49700 | ν1 = 81.6 |
| R2 = −257.073 | D2 = 1.00 | | |
| R3 = 132.920 | D3 = 6.20 | N2 = 1.48749 | ν2 = 70.2 |
| R4 = 1729.109 | D4 = 2.50 | | |
| R5 = −374.465 | D5 = 3.70 | N3 = 1.80610 | ν3 = 41.0 |
| R6 = 217.881 | D6 = 52.50 | | |
| R7 = 73.568 | D7 = 6.00 | N4 = 1.49700 | ν4 = 81.6 |
| R8 = 368.905 | D8 = 0.30 | | |
| R9 = 60.726 | D9 = 3.50 | N5 = 1.60311 | ν5 = 60.7 |
| R10 = 47.463 | D10 = 27.50 | | |
| R11 = 288.244 | D11 = 2.60 | N6 = 1.80518 | ν6 = 25.4 |
| R12 = −495.014 | D12 = 2.00 | N7 = 1.69680 | ν7 = 55.5 |
| R13 = 81.933 | D13 = 35.00 | | |
| R14 = 56.687 | D14 = 1.70 | N8 = 1.84666 | ν8 = 23.9 |
| R15 = 32.492 | D15 = 6.00 | N9 = 1.51742 | ν9 = 52.4 |
| R16 = −497.199 | D16 = 7.00 | | |
| R17 = 83.429 | D17 = 3.50 | N10 = 1.84666 | ν10 = 23.8 |
| R18 = −117.934 | D18 = 1.50 | N11 = 1.69680 | ν11 = 55.5 |
| R19 = 32.158 | D19 = 4.70 | | |
| R20 = −60.919 | D20 = 1.50 | N12 = 1.77250 | ν12 = 49.6 |
| R21 = 155.422 | D21 = 2.00 | | |
| R22 = 64.259 | D22 = 8.50 | N13 = 1.69680 | ν13 = 55.5 |
| R23 = −34.613 | D23 = 1.80 | N14 = 1.83400 | ν14 = 37.2 |
| R24 = −81.893 | | | |

TABLE 1

| | Equations | Numerical examples | | | |
|---|---|---|---|---|---|
| | | 1 | 2 | 3 | 4 |
| (1a) | I4 | −1.19 | −1.20 | −1.71 | −1.71 |
| (2a) | I5 | 1.17 | 1.07 | 2.07 | 2.34 |
| (3a) | \|I4/I5\| | 1.02 | 1.12 | 0.83 | 0.73 |
| (1) | f123/f | 0.50 | 0.50 | 0.47 | 0.47 |
| (2) | \|f4/f\| | 0.110 | 0.109 | 0.092 | 0.092 |
| (3) | f5/f | 0.189 | 0.186 | 0.155 | 0.153 |
| (4) | f1/f | 0.498 | 0.486 | 0.468 | 0.445 |
| (5) | \|f2/f\| | 0.491 | 0.522 | 0.430 | 0.469 |
| (6) | f3/f | 0.390 | 0.446 | 0.350 | 0.428 |
| (7) | (R5s + R5e)/(R5s − R5e) | −0.27 | −0.24 | −0.12 | −0.12 |
| (8) | (R4s + R4e)/(R4s − R4e) | −4.12 | −3.21 | −4.48 | −3.32 |
| (9) | (R3s + R3e)/(R3s − R3e) | −0.73 | −0.48 | −1.02 | −0.80 |

Figure 2A:
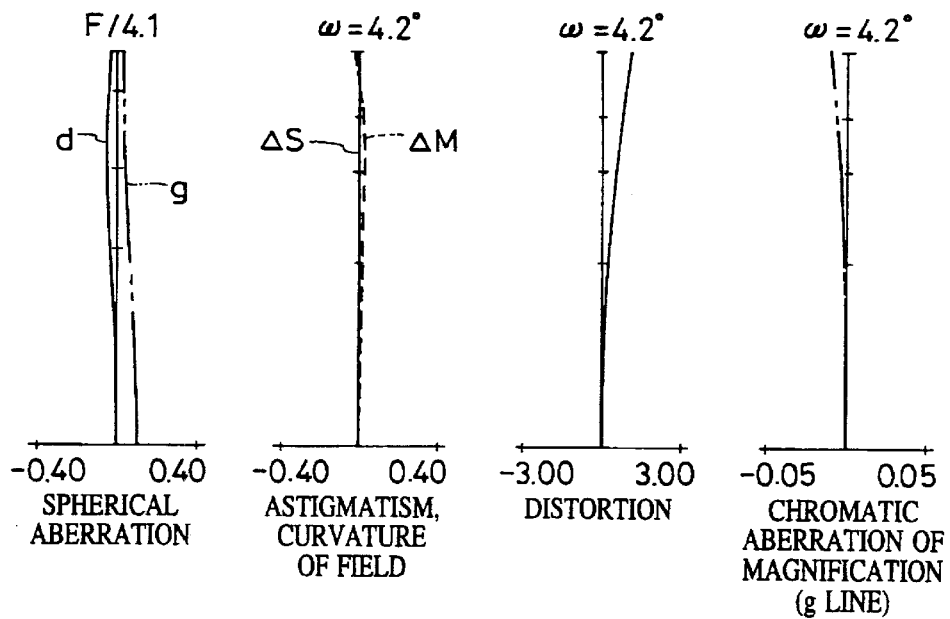
FIGS. 2A and 2B are aberration charts of the first numerical example focused on objects at infinity and at a near distance.
Figure 2B:
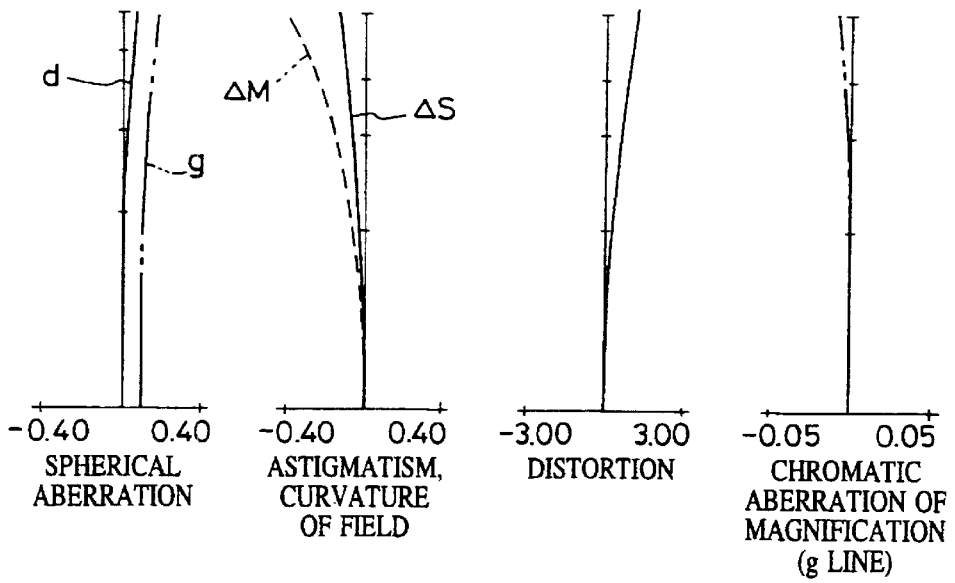
Figure 3A:
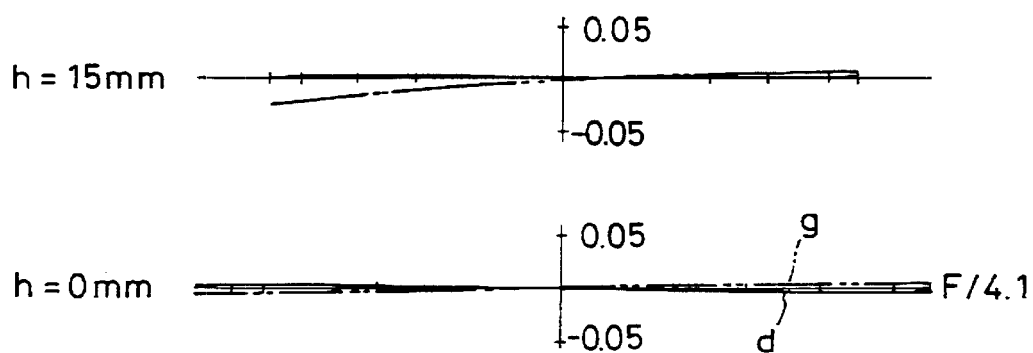
FIGS. 3A and 3B are transverse aberration charts wherein the reference state of the first numerical example at an infinity focus position is corrected for image blur.
Figure 3B:
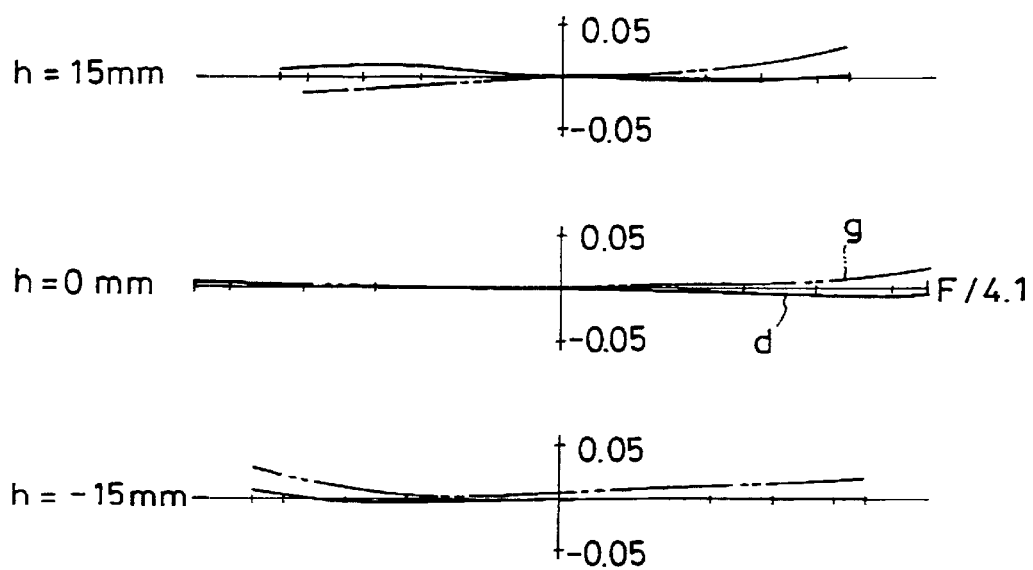
Figure 4A:
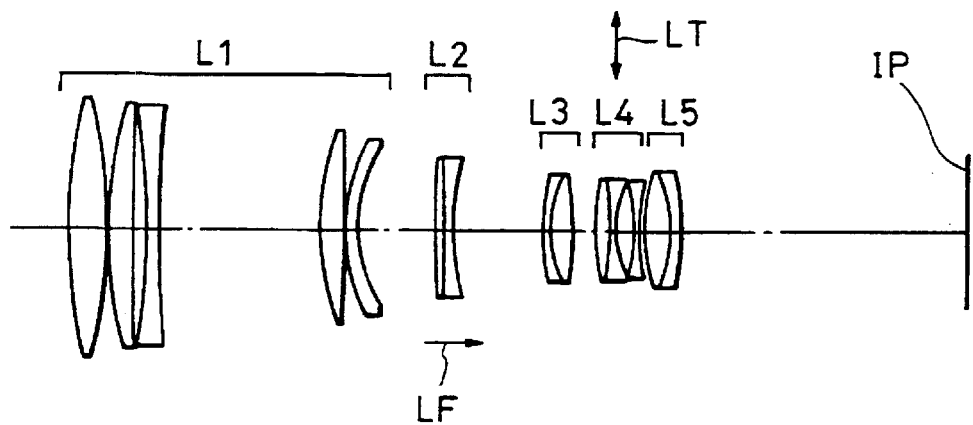
FIGS. 4A and 4B are cross-sectional views of lenses of a second numerical example of the present invention.
Figure 4B:
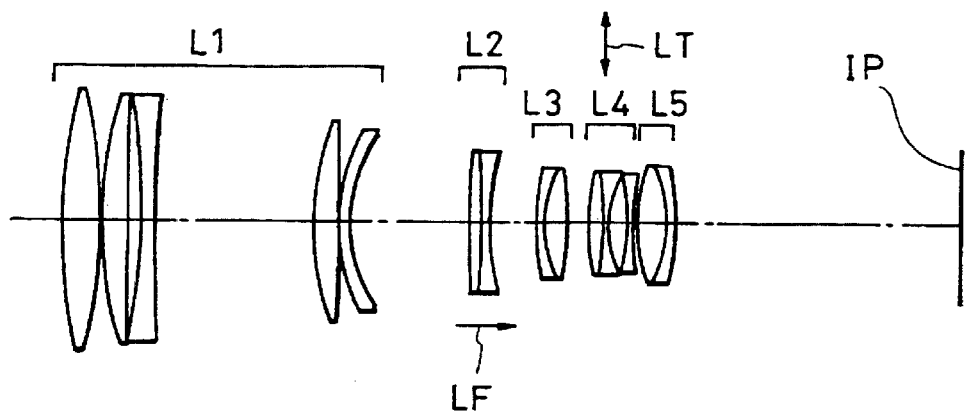

FIG. 2A shows longitudinal aberrations of a reference state of the first numerical example that is focused on an object at infinity. FIG. 2B shows transverse aberrations of a reference state of the first numerical example that is focused on an object that is located at a distance about 10 times as long as the focal length of the first numerical example. FIG. 3A shows, at image heights of h=0 mm and h=±15 mm, transverse aberrations of the reference state of the first numerical example that is focused on an object at infinity. FIG. 3B shows, at image heights of h=0 mm and h=±15 mm, transverse aberrations of the reference state of the first numerical example that is focused on an object at infinity when an image blur on the image plane corresponding to 0.5° is corrected.

Figure 5A:
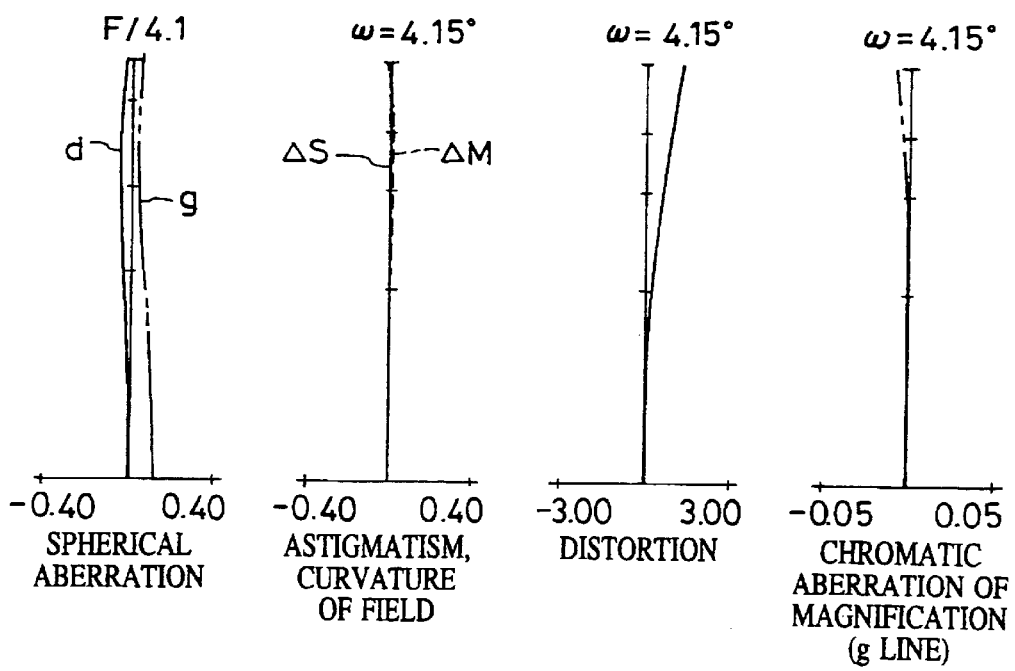
FIGS. 5A and 5B are aberration charts of the second numerical example focused on objects at infinity and at a near distance.
Figure 5B:
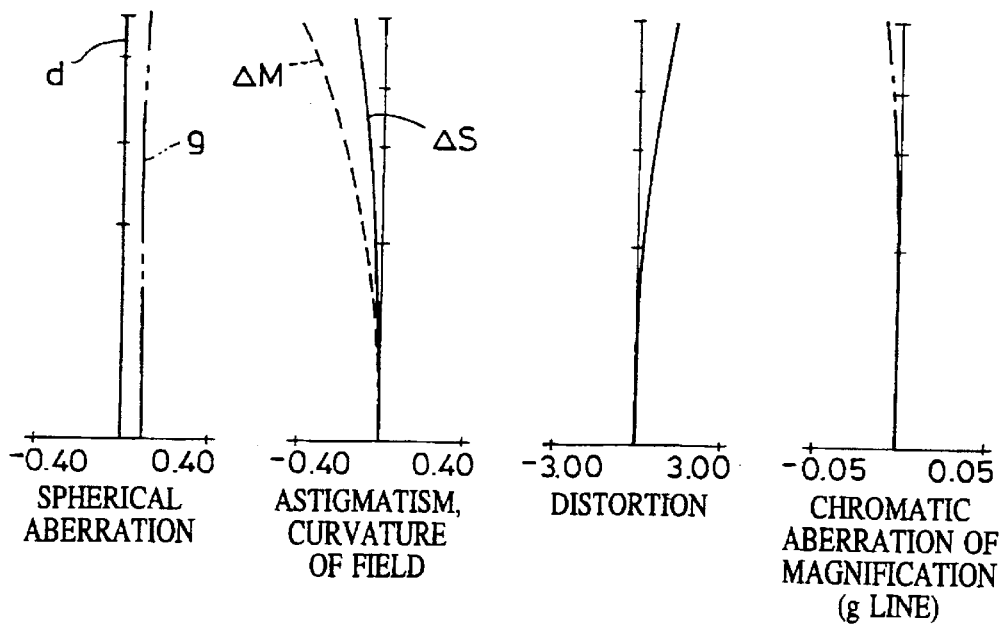
Figure 6A:
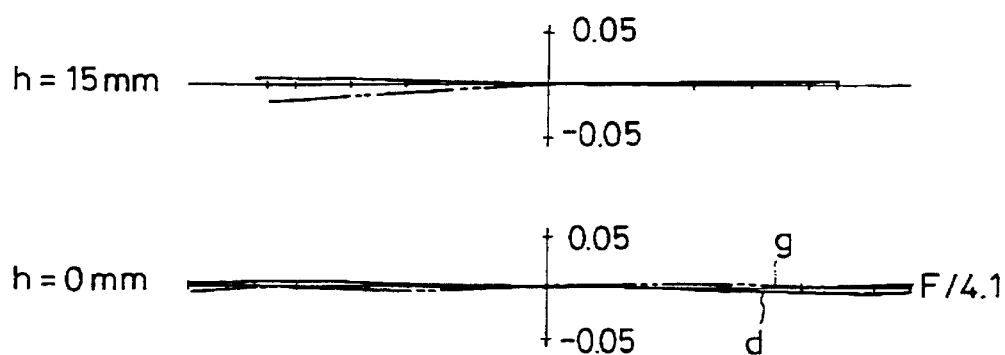
FIGS. 6A and 6B are transverse aberration charts wherein the reference state of the second numerical example at an infinity focus position is corrected for image blur.
Figure 6B:
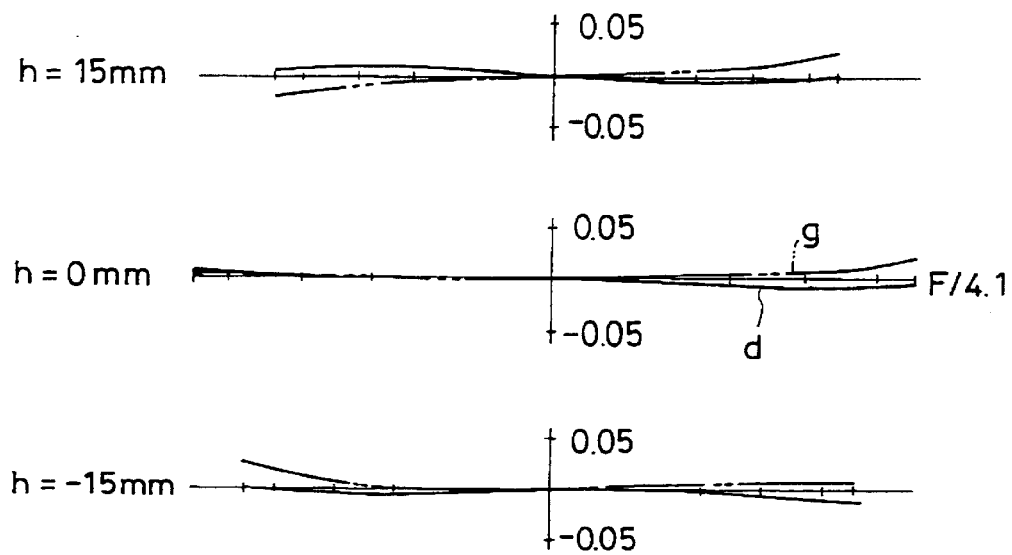
Figure 7A:
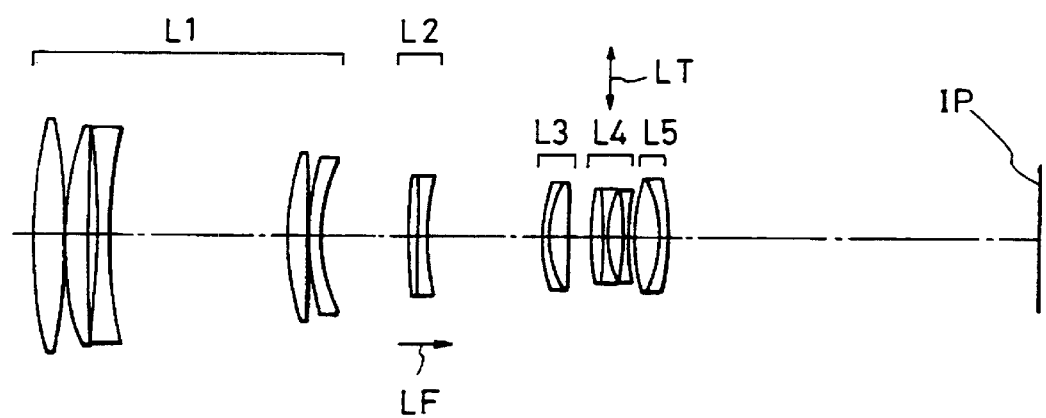
FIGS. 7A and 7B are cross-sectional views of lenses of a third numerical example of the present invention.
Figure 7B:
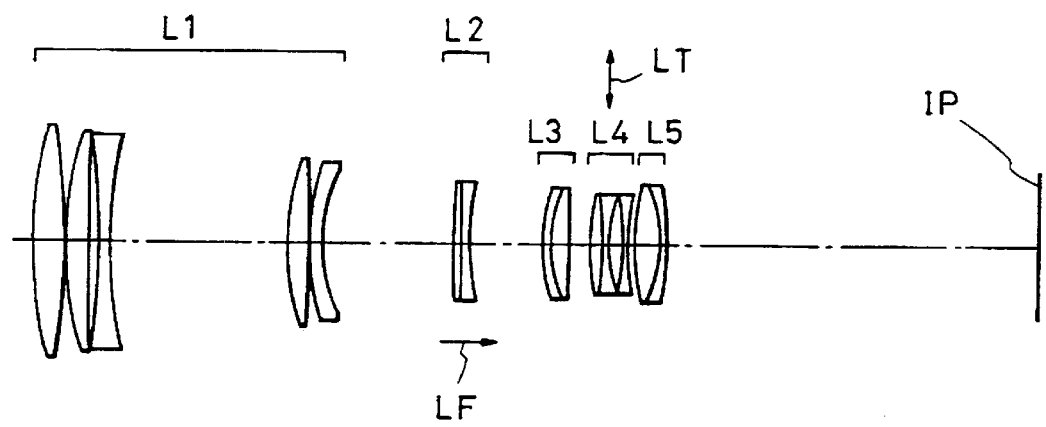

FIG. 5A shows longitudinal aberrations of a reference state of the second numerical example that is focused on an object at infinity. FIG. 5B shows transverse aberrations of a reference state of the second numerical example that is focused on an object that is located at a distance about 10 times as long as the focal length of the second numerical example. FIG. 6A shows, at image heights of h=0 mm and h=±15 mm, transverse aberrations of the reference state of the second numerical example that is focused on an object at is infinity. FIG. 6B shows, at image heights of h=0 mm and h=±15 mm, transverse aberrations of the reference state of the second numerical example that is focused on an object at infinity when an image blur on the image plane corresponding to 0.5° is corrected.

Figure 8A:
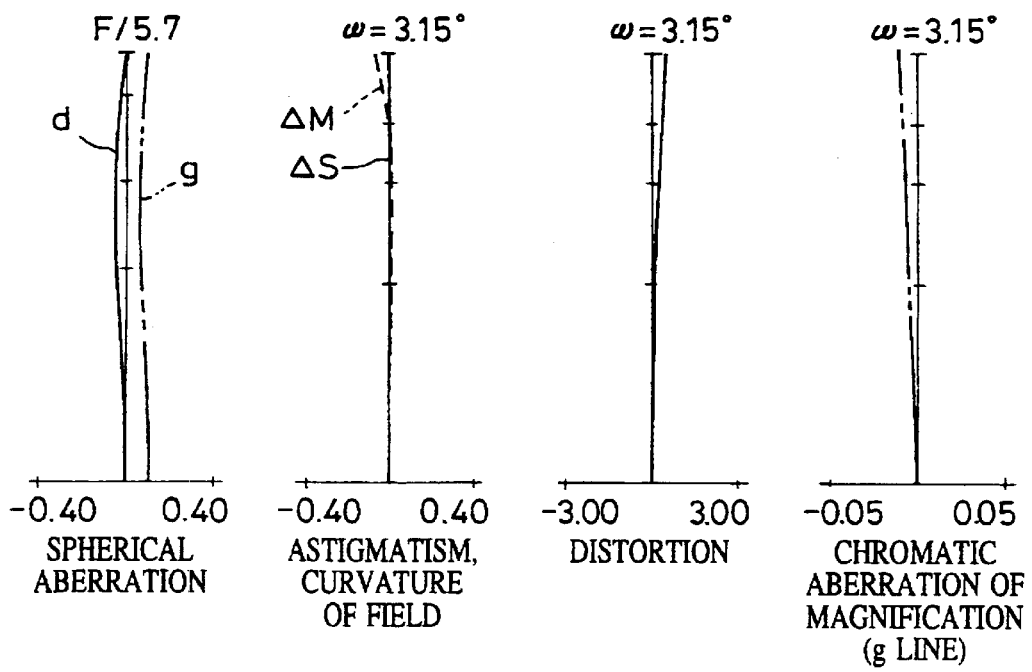
FIGS. 8A and 8B are aberration charts of the third numerical example focused on objects at infinity and at a near distance.
Figure 8B:
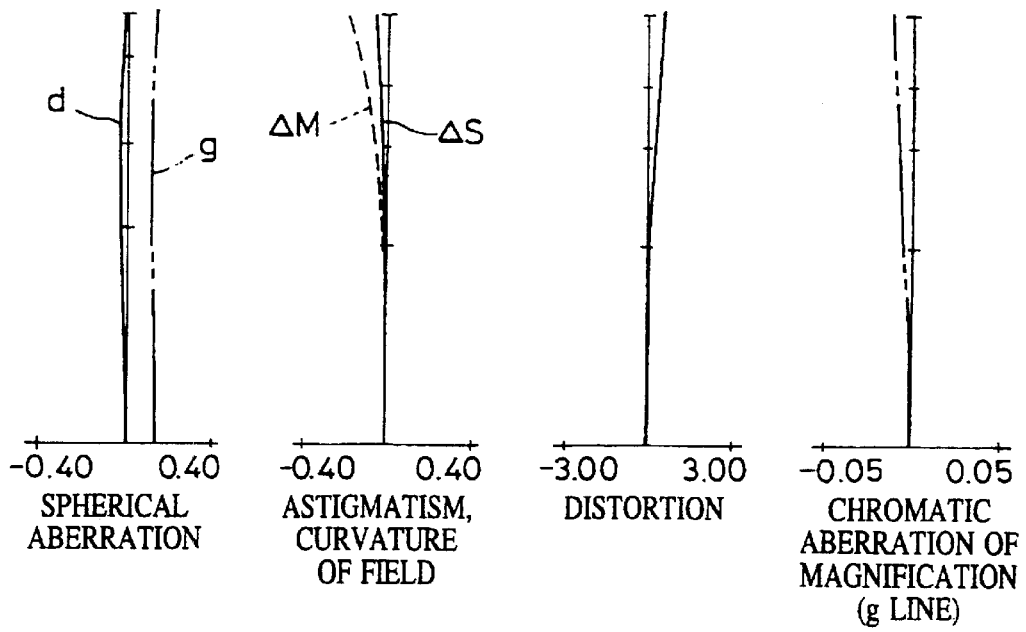
Figure 9A:
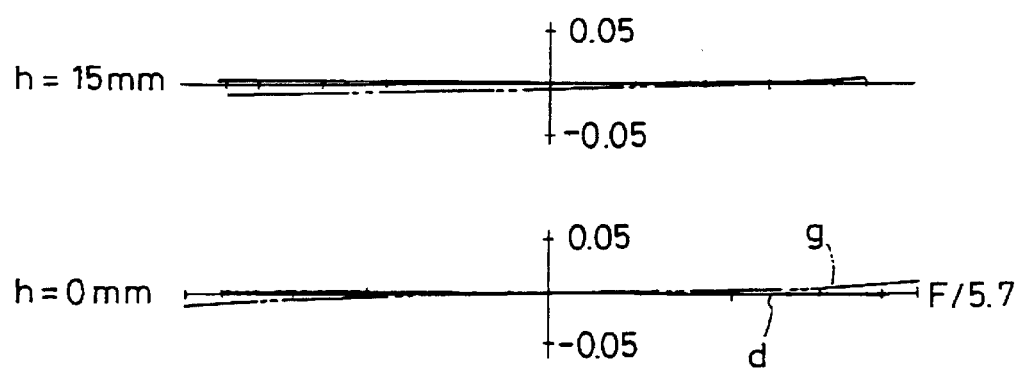
FIGS. 9A and 9B are transverse aberration charts wherein the reference state of the third numerical example at an infinity focus position is corrected for image blur.
Figure 9B:
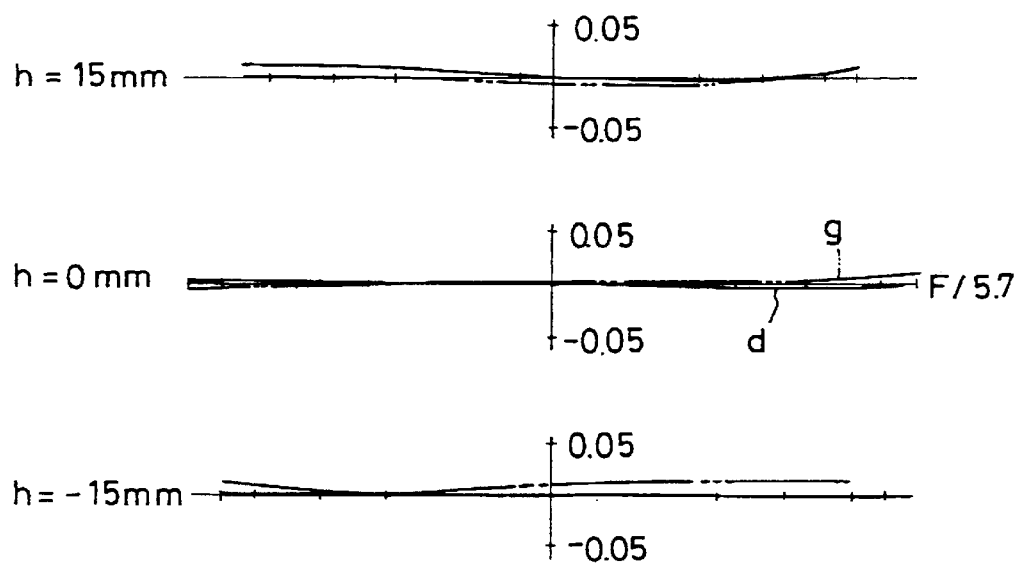
Figure 10A:
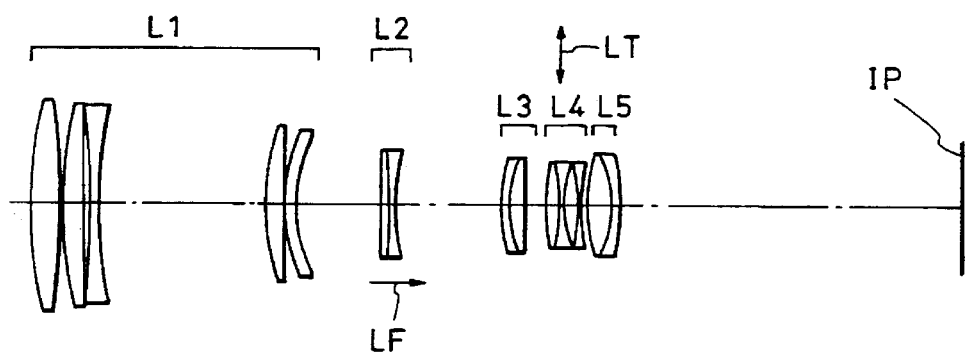
FIGS. 10A and 10B are cross-sectional views of lenses of a fourth numerical example of the present invention.
Figure 10B:
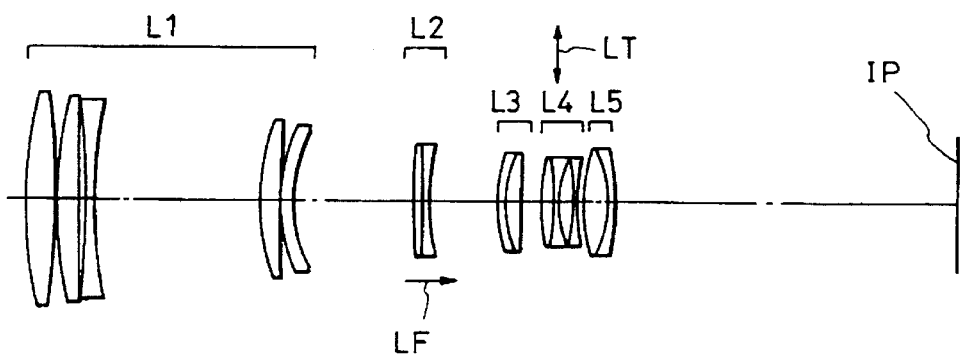

FIG. 8A shows longitudinal aberrations of a reference state of the third numerical example that is focused on an object at infinity. FIG. 8B shows transverse aberrations of a reference state of the third numerical example that is focused on an object that is located at a distance about 10 times as long as the focal length of the third numerical example. FIG. 9A shows, at image heights of h=0 mm and h=±15 mm, transverse aberrations of the reference state of the third numerical example that is focused on an object at infinity. FIG. 9B shows, at image heights of h=0 mm and h=±15 mm, transverse aberrations of the reference state of the third numerical example that is focused on an object at infinity when an image blur on the image plane corresponding to 0.5° is corrected.

Figure 11A:
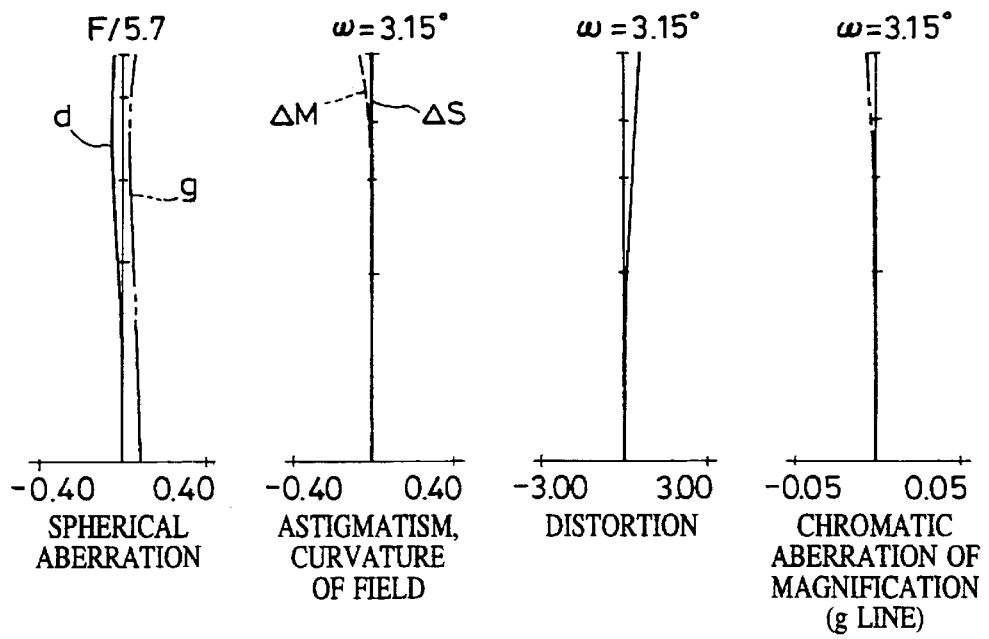
FIGS. 11A and 11B are aberration charts of the fourth numerical example focused on objects at infinity and at a near distance.
Figure 11B:
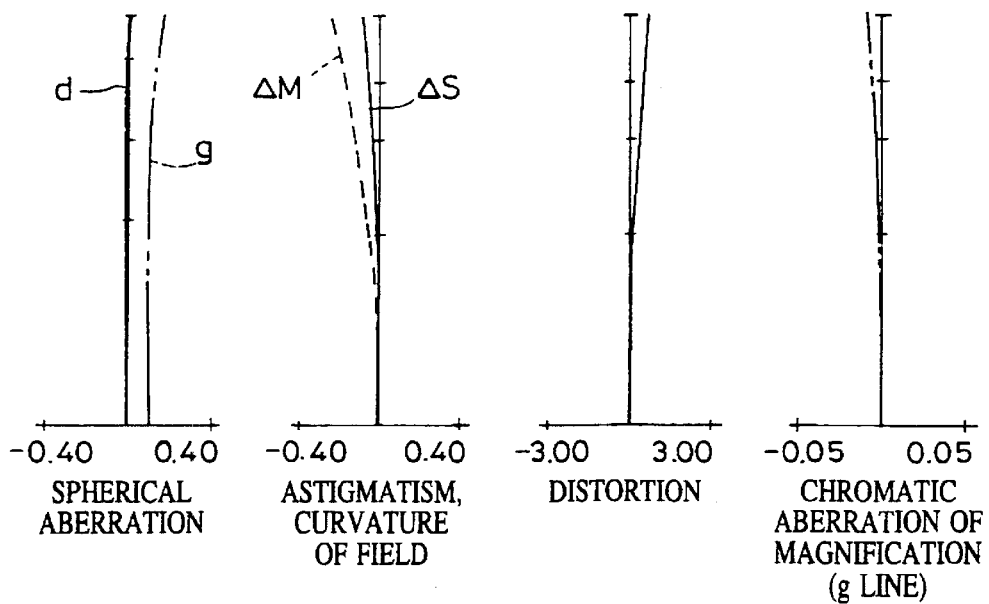
Figure 12A:
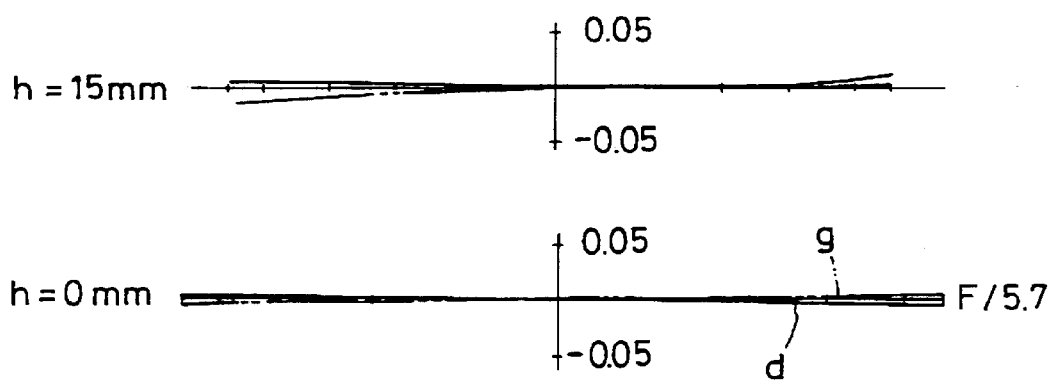
FIGS. 12A and 12B are transverse aberration charts wherein the reference state of the fourth numerical example at an infinity focus position is corrected for image blur.
Figure 12B:
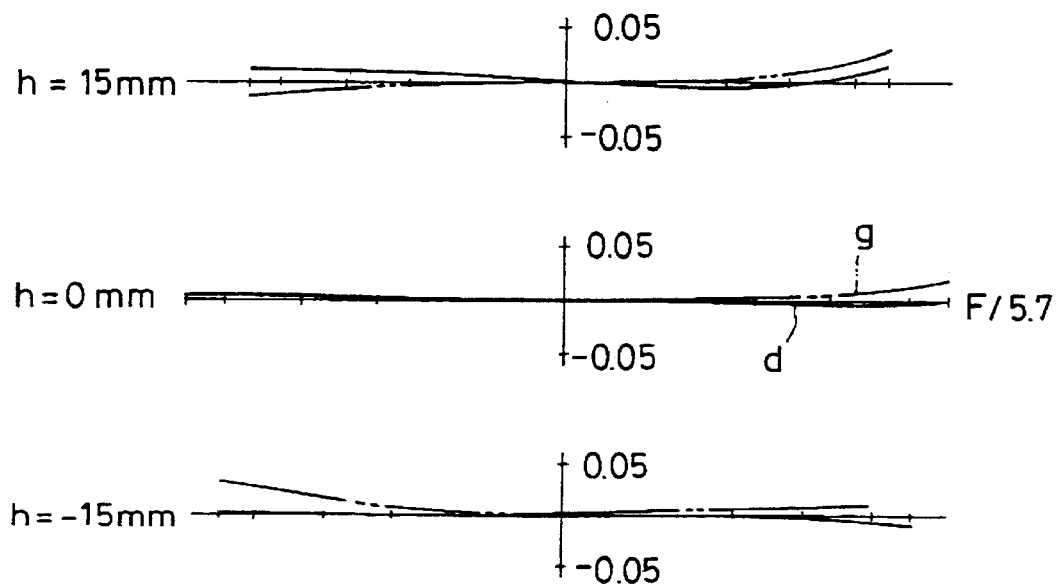

FIG. 11A shows longitudinal aberrations of a reference state of the fourth numerical example that is focused on an object at infinity. FIG. 11B shows transverse aberrations of a reference state of the fourth numerical example that is focused on an object that is located at a distance about 10 times as long as the focal length of the fourth numerical example. FIG. 12A shows, at image heights of h=0 mm and h=±15 mm, transverse aberrations of the reference state of the fourth numerical example that is focused on an object at infinity. FIG. 12B shows, at image heights of h=0 mm and h=±15 mm, transverse aberrations of the reference state of the fourth numerical example that is focused on an object at infinity when an image blur on the image plane corresponding to 0.5° is corrected.

In the first and second numerical examples, the present invention is applied to a telephoto imaging optical system having a diagonal angle of view of 8.3° or so and an f number of 4. The ratio of a travel of the fourth lens unit in a direction perpendicular to the optical axis to an image blur correction (decentering sensitivity of the fourth lens unit L4) is −2.5, which is sufficiently large. Assuming that the unit of measure is in mm in the first and second numerical examples, a travel of 1 mm of the fourth lens unit in a direction perpendicular to the optical axis corrects a displacement of −2.5 mm on the image plane. More particularly, a movement of 0.5° or less at the focal length of the first and second numerical examples can be corrected.

In the third and fourth numerical examples, the present invention is applied to a telephoto imaging optical system having a diagonal angle of view of 6.2° or so and an f number of 5.6. The decentering sensitivity of the fourth lens unit L4 is −3.0 in both examples.

The present invention works in telephoto optical systems having different angles of view in a wide range. The decentering sensitivity of the fourth lens unit L4 may be larger or smaller than those quoted above.

According to the present invention, an optical system with an image stabilizing function that is suitable for use in a telephoto imaging optical system of an inner focus type is provided, wherein when part of a lens unit in the optical system is decentered in a direction perpendicular to the optical axis of the system to correct the displacement (blur) of an image, each decentering aberration is properly corrected by arranging each lens element and the entire system is made compact by allowing a sufficiently small decentering driving input to cover a large displacement correction (image blur correction) range.

What is claimed is:

1. An image stabilizing optical objective lens system comprising, in the order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power, wherein said second lens unit is moved in the direction of the optical axis of the system for focusing and said fourth lens unit is moved in a direction perpendicular to the optical axis for correcting image blur, and wherein when the focal length of the entire system is normalized to 1, the following relationships hold true:

$$-5.0 < I4 < -0.7$$

$$0.7 < I5 < 5.0$$

$$0.5 < |I4/I5| < 2.0$$

where I4 and I5 represent respectively the spherical aberration coefficients of said fourth and fifth lens units focused on an object at infinity.

2. An image stabilizing optical objective lens system according to claim 1, wherein the following relationships hold true:

$$0.25 < f123/f < 0.75$$

$$0.07 < |f4/f| < 0.15$$

$$0.10 < f5/f < 0.30$$

where f123 represents the total focal length of said first lens unit through said third lens unit, f represents the focal length of the entire system and fi represents a focal length of an i-th lens unit.

3. An image stabilizing optical objective lens system according to claim 1, wherein the following relationships hold true:

$$0.35 < f1/f < 0.60$$

$$0.30 < |f2/f| < 0.70$$

$$0.25 < f3/f < 0.60,$$

where fi represents a focal length of an i-th lens unit and f represents the focal length of the entire system.

4. An image stabilizing optical objective lens system according to claim 1, wherein said fifth lens unit comprises, in the order from the side of the system closest to the object, a positive lens and a negative lens, and wherein the following relationship holds true:

$$-0.6<(R5s+R5e)/(R5s-R5e)<0.1$$

where R5s and R5e represent respectively the radii of curvature of the lens surface of the fifth lens unit closes to the object and the lens surface of the firth lens unit closest to an image plane.

5. An image stabilizing optical objective lens system according to claim 1, wherein said fourth lens unit comprises, in the order from the side of the system closest to the object, one positive lens and two negative lenses, and wherein the following relationship holds true:

$$-10<(R4s+R43)/(R4s-R4e)<-1.5$$

where R4s and R4e represent respectively the radii of curvature of the lens surface of the fourth lens unit closest to the object and the lens surface of the fourth lens unit closest to an image plane.

6. An image stabilizing optical objective lens system according to claim 1, wherein said third lens unit comprises, in the order from the side of the system closest to the object, one negative lens and two positive lenses, and wherein the following relationship holds true:

$$-1.5<(R3s+R3e)/(R3s-R3e)<-0.2$$

where R3s and R3e represent respectively the radii of curvature of the lens surface of the third lens unit closest to the object and the lens surface of the third lens unit closest to an image plane.

7. An image stabilizing optical objective lens system according to claim 1, wherein said first lens unit comprises two positive lenses and one negative lens, and wherein said second lens unit comprises a positive lens and a negative lens.

8. An image stabilizing optical objective lens system comprising, in order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power, wherein said second lens unit is movable in a direction of the optical axis of the system for focusing, and said fourth lens unit is movable in a direction perpendicular to the optical axis for correcting image blur, and wherein the following relationships hold true:

$$0.25<f123/f<0.75$$

$$0.07<|f4/f|<0.15$$

$$0.10<f5/f<0.30$$

where f123 represents the total focal length of said first lens unit through said third lens unit, f represents the focal length of the entire system and fi represents a focal length of an i-th lens unit.

9. An image stabilizing optical objective lens system according to claim 8, wherein the following relationships hold true:

$$0.35<f1/f<0.60$$

$$0.30<|f2/f|<0.70$$

$$0.25<f3/f<0.60,$$

where fi represents a focal length of an i-th lens unit and f represents the focal length of the entire system.

10. An image stabilizing optical objective lens system according to claim 8, wherein said fifth lens unit comprises, in order from the side of the system closest to the object, a positive lens and a negative lens, wherein the following relationship holds true:

$$-0.6<(R5s+R5e)/(R5s-R5e)<0.1$$

where R5s and R5e represent respectively the radii of curvature of the lens surface of the fifth lens unit closest to the object and the lens surface of the fifth lens unit closest to an image plane.

11. An image stabilizing optical objective lens system according to claim 8, wherein said fourth lens unit comprises, in the order from the side of the system closest to the object, one positive lens and two negative lenses, and wherein the following relationship holds true:

$$-10<(R4s+R4e)/(R4s-R4e)<-1.5$$

where R4s and R4e represent respectively the radii of curvature of the lens surface of the fourth lens unit closest to the object and the lens surface of the fourth lens unit closest to an image plane.

12. An image stabilizing optical object lens system according to claim 8, wherein said third lens unit comprises, in the order from the side of the system closest to the object, one negative lens and two positive lenses, and wherein the following relationship holds true:

$$-1.5<(R3s+R3e)/(R3s-R3e)<-0.2$$

where R3s and R3e represent respectively the radii of curvature of the lens surface of the third lens unit closest to the object and the lens surface of the third lens unit closest to an image plane.

13. An image stabilizing optical objective lens system according to claim 8, wherein said first lens unit comprises two positive lenses and one negative lens, and wherein said second lens unit comprises a positive lens and a negative lens.

14. An image stabilizing optical objective lens system according to claim 8, wherein an objective lens of said system has a fixed focal length.

15. An image stabilizing optical objective lens system according to claim 8, wherein said third lens unit and said fifth lens unit are fixed.

16. An image stabilizing optical objective lens system comprising, in order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power, wherein said second lens unit is movable in a direction of the optical axis of the system for focusing, and said fourth lens unit is movable in a direction perpendicular to the optical axis for correcting image blur, and wherein the following relationships hold true:

$$0.35<f1/f<0.60$$

$$0.30<|f2/f|<0.70$$

$$0.25<f3/f<0.60,$$

where fi represents a focal length of an i-th lens unit and f represents the focal length of the entire system.

17. An image stabilizing optical objective lens system comprising, in order from the side of the system closest to an object, a first lens unit having a positive refractive power, a second lens unit having a negative refractive power, a third lens unit having a positive refractive power, a fourth lens unit having a negative refractive power, and a fifth lens unit having a positive refractive power, wherein said second lens unit is movable in a direction of the optical axis of the system for focusing, and said fourth lens unit is movable in a direction perpendicular to the optical axis for correcting image blur, wherein said third lens unit comprises, in order from the side of the system closest to the object, one negative lens and two positive lenses, and wherein the following relationship holds true:

$$-1.5<(R3s+R3e)/(R3s-R3e)<-0.2$$

where $R3s$ and $R3e$ represent respectively the radii of curvature of the lens surface of the third lens unit closest to the object and the lens surface of the third lens unit closest to an image plane.

* * * * *

UNITED STATES PATENT AND TRADEMARK OFFICE
CERTIFICATE OF CORRECTION

PATENT NO. : 6,618,197 B1
DATED : September 9, 2003
INVENTOR(S) : Shingo Hayakawa It is certified that error appears in the above-identified patent and that said Letters Patent is hereby corrected as shown below:

Title page,
Item [*] Notice, insert -- This patent issued on a continued prosecution application filed under 37 CFR 1.53(d), and is subject to the twenty year patent term provisions of 35 U.S.C. 154(a)(2). --.

Column 1,
Line 33, "56-223819" should read -- 61-223819 --.

Column 9,
Line 63, "D7 =0 6.00" should read -- D7 = 6.00 --.

Column 12,
Line 10, "(blur)" should read -- (blurring) --.

Column 13,
Line 6, "closes" should read -- closest --.
Line 7, "firth" should read -- fifth --.
Line 15, "R43)" should read -- R4e) --.

Signed and Sealed this

Twenty-second Day of March, 2005

JON W. DUDAS
*Director of the United States Patent and Trademark Office*